No. 607,178. Patented July 12, 1898.
J. KOLB.
COMBINED PLOW AND HARROW.
(Application filed May 3, 1897.)
(No Model.)
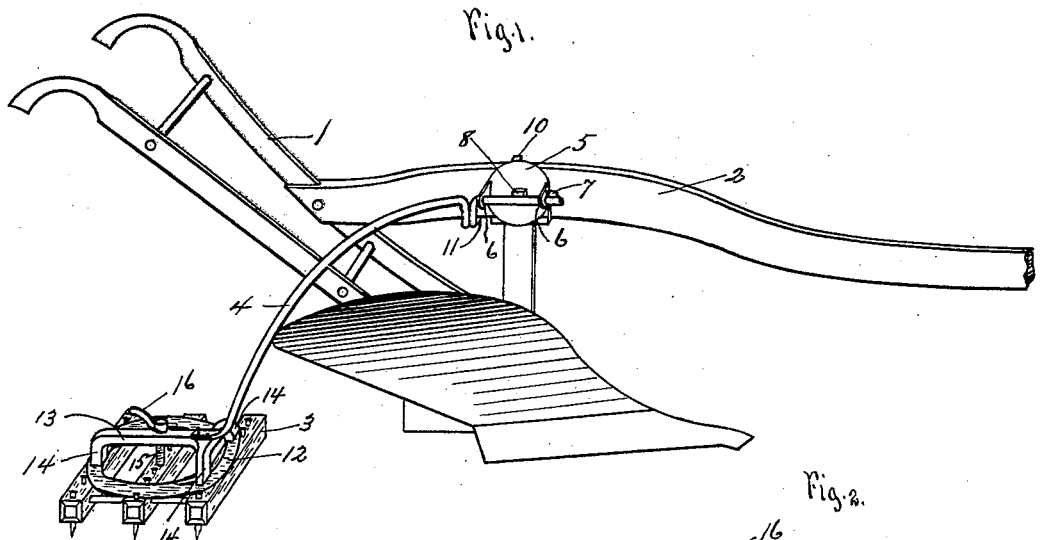
Witnesses.
James L. Dyer
S. S. Strat
Inventor.
Jacob Kolb
By N. B. Hagin atty.
THE NORRIS PETERS CO., PHOTO-LITHO., WASHINGTON, D. C.

UNITED STATES PATENT OFFICE.

JACOB KOLB, OF WICHITA, KANSAS.

COMBINED PLOW AND HARROW.

SPECIFICATION forming part of Letters Patent No. 607,178, dated July 12, 1898.

Application filed May 3, 1897. Serial No. 634,802. (No model.)

*To all whom it may concern:*

Be it known that I, JACOB KOLB, a citizen of the United States of America, residing at Wichita, in the county of Sedgwick and State of Kansas, have invented certain new and useful Improvements in a Combined Plow and Harrow, of which the following is a specification, reference being had therein to the accompanying drawings and the figures of reference thereon, forming a part of this specification, in which—

Figure 1 is a perspective view of my improved combined plow and harrow. Fig. 2 is a side view of the harrow with attachments. Fig. 3 is a top plan of the same. Fig. 4 is a detail of the oscillating disk with a portion of the connecting-arm. Fig. 5 is a detail of a portion of said arm. Fig. 6 is a like view of the same, showing the portion 11. Fig. 7 is an edge view of the disk. Fig. 8 is a sectional view of the same. Fig. 9 is a view showing the collar on the bolt for securing the disk to the plow-beam. Fig. 10 is a detail showing the plow 2 in cross-section, together with the disk and a portion of the arm 4. Fig. 11 is a detail perspective view of the arched girder.

This invention relates to certain improvements in a combined plow and harrow; and it consists in the construction of the harrow and the means of securing said harrow to a plow; and the object of my invention is to attach a harrow to a plow so that said harrow can be easily and quickly detached and when attached easily handled while using.

Referring to the drawings, 1 represents an ordinary plow.

2 represents a plow-beam. 3 represents a harrow. 4 represents an arm connecting said plow and harrow. Said arm is journaled in the lugs 6 of the disk 5 and is held in place by the pin 7.

8 represents a bolt which passes through the collar 9. The disk 5 is sleeved on said collar 9, and the bolt 8 is for securing said disk 5 to the plow-beam 2.

10 represents a lug on the periphery of the disk 5, extending over and somewhat above the plow-beam 2.

11 represents the arm 4 bent down under and somewhat below the plow-beam to form an arm.

12 represents a flat circular plate secured to the upper surface of the harrow.

13 represents an arched girder, to which is secured one end of the connecting-arm 4. 14 represents the legs of said arched girder, which are adapted to rest on the circular plate 12. Said arched girder is held in place on said harrow through the medium of the screw 15 and the nut 16.

This harrow is attached to the plow and they together are used in the following manner: The disk 5 is first secured to the plow-beam by the bolt 8, said disk being sleeved on the collar 9, which will turn easily on the bolt 8, and as said collar is slightly thicker than the disk the bolt can be drawn up tight without binding the disk to the plow-beam. Thus the disk will freely oscillate. The arm 4 is then passed through the holes in the lugs 6 and held in place by the pin 7, and as the arm 11 extends somewhat below the lower surface of the plow-beam 2 the arm 4 can oscillate in the openings of the lugs 6. By having this compound oscillating motion the harrow can easily conform to the uneven plowed ground. In turning the plow around at the end of a row the plow is tipped over on the landside in the usual manner, when the disk will oscillate until the lug 10 reaches the upper side of the plow-beam and the arm 11 engages the under side of said plow-beam, which will, through the medium of the arm 4, raise the harrow from the ground. The harrow can be set in any position to the line of draft by loosening the nut 16 and turning the harrow, when the arched girder will turn on the circular plate 12, when the nut 16 can be retightened, holding the harrow in position.

When it is desired to remove the plow and harrow from the field, the harrow can be raised up so the arm 4 will rest on the plow-beam 2, which will throw the harrow on the landside above the plow, with the teeth up. In removing the harrow from the plow the pin 7 is drawn and the arm 4 removed from the holes in the lugs 6.

Having thus described my invention, what

I claim as new and useful, and desire to secure by Letters Patent, is as follows:

1. The combination of a plow having a disk journaled to the beam, an arm with one end journaled to said disk, and the other end secured to a harrow, said disk having the lug 10, and said arm having the arm 11.

2. A harrow having a circular plate secured to said harrow, an arched girder held on said circular plate, a disk secured to the plow-beam, an arm connecting said harrow to said disk, said disk giving said arm a double oscillating motion.

JACOB KOLB.

Witnesses:
A. E. HELM,
L. M. MAXWELL.